Figure 1:
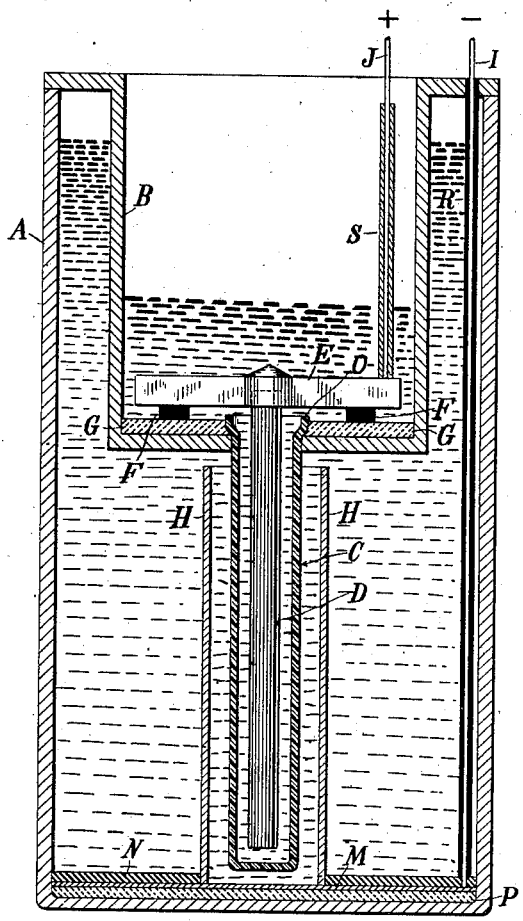

No. 729,240. PATENTED MAY 26, 1903.
E. TWEEDY, I. L. ROBERTS & G. R. TWEEDY.
ELECTRIC BATTERY.
APPLICATION FILED MAY 22, 1900.
NO MODEL. 2 SHEETS—SHEET 1.

Witnesses:
Raphaël Netter
John C. Kent

Inventors: Edmund Tweedy,
Isaiah L. Roberts, 2nd
George R. Tweedy
by Kerr, Page & Cooper, Att'ys

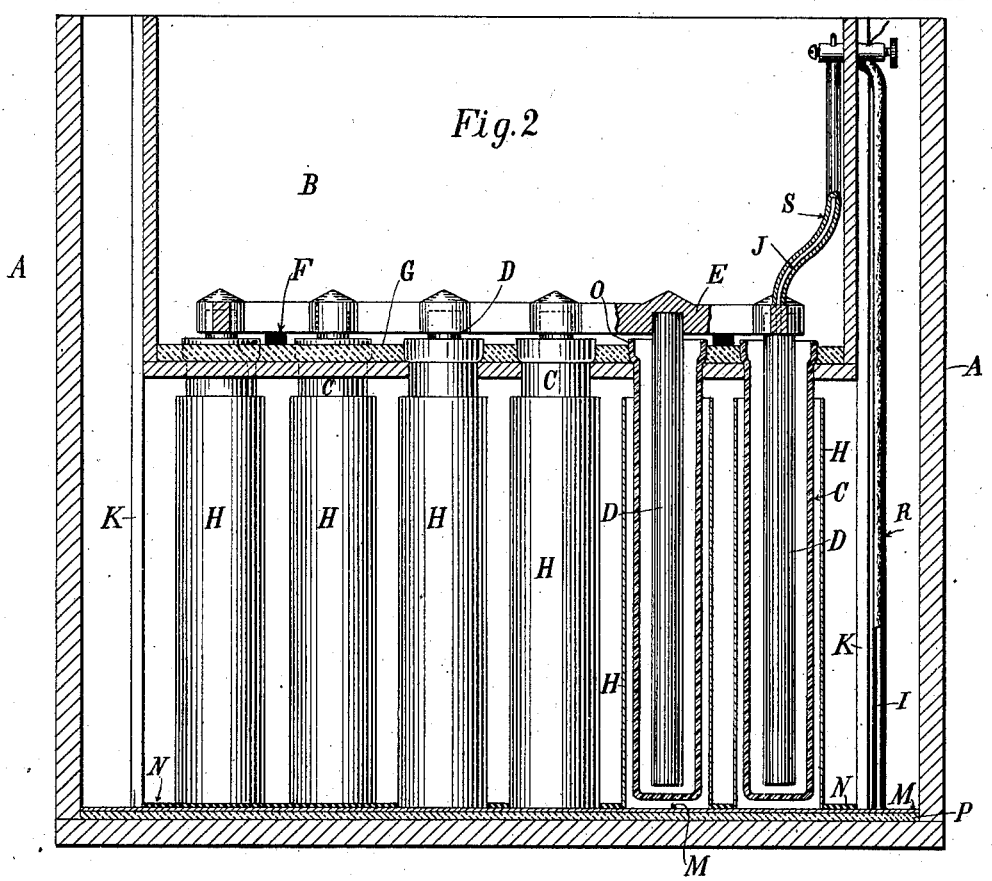
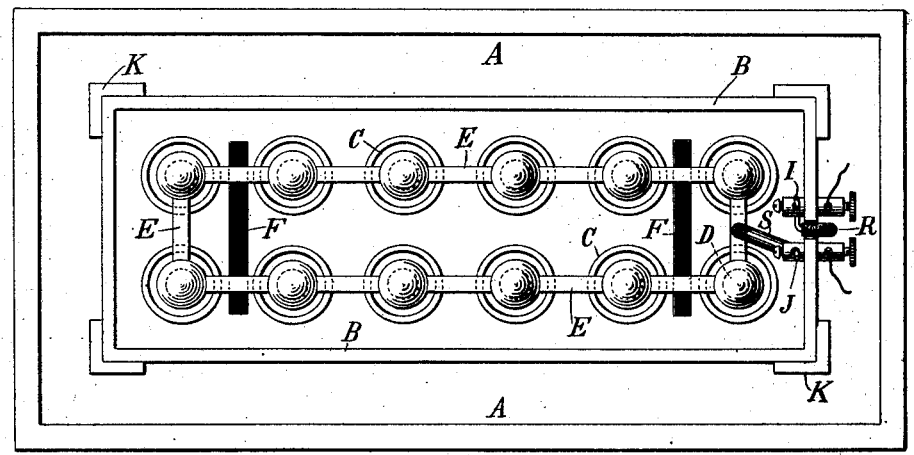

No. 729,240.

Patented May 26, 1903.

UNITED STATES PATENT OFFICE.

EDMUND TWEEDY, OF NEW YORK, AND ISAIAH L. ROBERTS, OF BROOKLYN, NEW YORK, AND GEORGE R. TWEEDY, OF DANBURY, CONNECTICUT, ASSIGNORS TO THE ROBERTS BATTERY COMPANY, A CORPORATION OF NEW YORK.

ELECTRIC BATTERY.

SPECIFICATION forming part of Letters Patent No. 729,240, dated May 26, 1903.

Application filed May 22, 1900. Serial No. 17,539. (No model.)

*To all whom it may concern:*

Be it known that we, EDMUND TWEEDY, residing at the borough of Manhattan, in the city, county, and State of New York; ISAIAH L. ROBERTS, residing at the borough of Brooklyn, in the city of New York, county of Kings, and State of New York, and GEORGE R. TWEEDY, residing at Danbury, in the county of Fairfield and State of Connecticut, all citizens of the United States, have invented certain new and useful Improvements in Electric Batteries, of which the following is a specification, reference being had to the drawings accompanying and forming a part of the same.

Our invention relates to that class of primary electric batteries known as "two-fluid" batteries, in which the two fluids or solutions are separated by a partition, diaphragm, or cup, one compartment thus formed containing the positive and the other the negative element of the battery; and its objects are to increase the efficiency, constancy, and durability of such batteries, to promote economy in their operation, and to extend the range of their usefulness.

Our improvements are particularly applicable to that class of batteries in which a non-porous electrolytic diaphragm or cup is used, as described in United States Letters Patent Nos. 394,613, 394,614, 394,615, 394,616, 394,617, 394,638, and 414,081, issued to Isaiah L. Roberts and to Henry L. Brevoort and Isaiah L. Roberts jointly; but they are not limited to that class of batteries, being also applicable to other two-fluid batteries in which the separating partition or cup is porous or of the usual character.

In the two-fluid batteries of the kind described in the patents above mentioned it has been usual to place in a suitable cell one or more porous cups of convenient form, the pores of which are filled with a gelatinized mineral substance, such as silicate of soda, and to suspend in the cup a plate or plates of zinc in a solution of salt or other electrolyzable substance in water, while outside of the cup or cups plates of carbon are suspended in a solution composed of bichromate of potash or bichromate of soda, sulfuric acid, and water.

In practice it has been found that a battery constructed in this manner requires frequent attention during its operation for the reason that when the circuit is closed and, nothwithstanding the impervious character of the cups, there is a constant diminution of the volume of the aqueous solution in the same and a correspondingly constant increase in the volume of the acid solution in the outer space surrounding them, thus making it necessary to supply additional water to the cups at frequent intervals in order to maintain the efficiency of the battery, and this frequent attention in the time and labor involved adds largely to the cost of maintaining the battery. One of the objects of our invention is to obviate the necessity of this frequent attention, and this we do by a peculiar and novel construction of the battery, particularly of the inner and outer compartments holding the solutions, and by their arrangement relatively to each other, as hereinafter described, whereby the battery can be maintained at work without attention until the strength of the active solution is exhausted.

In the class of batteries referred to and constructed as described the increase in the quantity of the active solution due to the action of the battery makes it necessary that the compartment containing it should be at first only partly—say one-half—full; otherwise as the solution increases in volume it will overflow into the cups and cause rapid local action, thus destroying the efficiency of the battery. The negative element is therefore at first only partially submerged in the solution and the quantity of current generated is proportionately less than if it were wholly submerged. In our present construction this difficulty is avoided, as we so arrange the elements that they are at all times wholly submerged when the battery is charged, so that their full value is obtained in the current generated.

In order to provide for a proper circulation of the active or acid solution about the negative element or elements, and thus to prevent polarization, we provide in the preferred mode of construction a receptacle to contain said solution, into the walls of which, preferably the bottom, treated cups are sealed, which form extensions from such receptacle, the closed ends projecting into the outer compartment, containing the aqueous solution. In these cups the negative elements are suspended or held and about the cups are arranged the positive elements in any convenient manner. The active or acid solution is placed in the receptacle, filling the same to a height above the rims of the cups and leaving a sufficient space in the same to allow for the increase in the volume of the solution therein due to the action of the battery. By this arrangement the circulation of the active solution about the negative element or elements is effected by gravity in the following manner: In the operation of the battery the electric current is transmitted through lines or chains of the electrolytic molecules of the liquids by their successive decomposition and recombination, the positive atoms of such molecules traveling toward the negative element and the negative atoms toward the positive element. Thus when sulfuric acid is used as an excitant the molecules are broken up by electrolytic action when the circuit is closed, and the acid radical $SO_4$ travels toward and unites with the positive element, such as zinc, while the hydrogen atoms travel toward the negative element, such as carbon, but before reaching it are seized by and united with the oxygen in the depolarizing substance contained in the acid solution, such as bichromate of potash. Thus in our construction the liquid in the cups becomes of lower specific gravity than that contained in the upper portion of the receptacle and rises upward, while the heavier liquid above descends and takes its place about the elements, thus causing a circulation of the liquid and bringing a fresh supply of the depolarizing substance into the cups and about the elements.

In the accompanying drawings, Figure 1 is a vertical central section of a simple form of battery embodying our invention. Fig. 2 is a similar view of a similar battery made up of a number of pairs of elements, and Fig. 3 is a plan view of the same.

A is the cell for containing the aqueous solution. This may be of any convenient form and may be constructed of any suitable material—such as glass, porcelain, iron, wood, &c.

B is the inner cell or receptacle, forming a compartment for containing the exciting liquid, and is supported in any convenient manner within the outer cell A. In Fig. 1 this receptacle is shown as provided with a flange at the top, which rests upon the top of the outer cell. Holes or apertures are made in this flange, one to allow of the passage of the conductor leading from the zinc or its supporting-plate and another through which water may be supplied to the outer cell without removing the inner receptacle. In Fig. 2 the inner receptacle is shown as supported upon legs K K, one of which extends downward from each corner to the bottom of the outer cell. The body of the receptacle may be constructed of any suitable material which will resist the action of the acid solution to be contained therein—such as porcelain, enameled iron, or wood with an acid-proof coating or lining.

The bottom of the receptacle B is provided with a hole or holes through which projects a diaphragm cup or cups C. The cups are provided at the upper or open ends with a flange O, which projects outwardly about one-fourth of an inch and is about one-half of an inch in height. The holes in the bottom of the receptacle are of sufficient diameter to permit of the passage through them of the main body of the cups, which are supported in position by the flange resting upon the bottom of the receptacle. After the cups are placed in position, the bottom of the receptacle up to the tops of the flanges is filled with an acid-proof cement G, such as ozocerite or asphalt and resin. In order that the part of the cup which comes into contact with the cement may not absorb moisture from the liquids to which it is to be exposed, and thus prevent the firm adherence of the cement, the flange and adjacent part of the cup are glazed. We prefer to fill the pores of the cups with gelatinized silicate of soda, as described in Patents Nos. 394,613 and 394,615; but our invention is not limited to the use of such gelatinized cups, for which reason we have designated herein the cups as "diaphragm-cups," by which term we intend to include cups made in any of the known ways.

D D are the carbon elements, about the tops of which is cast a head or grid of metal E. This head or grid may be made of any suitable metal or alloy of metals. After the head or grid is cast upon the carbons, we submerge the tops of the carbons with the connector in melted paraffin, removing them while hot and allowing the surplus paraffin to run off the surface before cooling. The paraffin is absorbed into the pores of the carbons and prevents the solution from coming into contact with the metal at its junction with the carbon. A copper wire J is cast into the head or grid and extends upward to a binding-post L at the top of the cell and is covered with a lead pipe S, securely fastened to the head or grid, which protects it from injury by the solution. After the connector is submerged in paraffin it is again submerged in an acid-proof cement, such as melted asphalt and resin, which cooling and hardening upon its surface acts as a protection against the action of the acid solution. The head or grid E rests upon supports F F, of hard rubber or other nonconducting material, affixed to the bottom or sides of the receptacle in any convenient manner. By this method of construction a number of carbon elements can be securely and permanently bound together in their proper positions, thus doing away with a number of independent connections and the evils resulting therefrom, as before pointed out.

H H are the zincs or positive elements of the battery. These are preferably made in the form of cylinders, with openings to allow of proper circulation or diffusion of the liquid, and are placed about the cups.

M is a plate of metal, preferably copper, lying at the bottom of the outer cell upon a bed of cement P, if desired, with a copper strip or wire I securely fastened thereto and extending upward, protected by a rubber tube R, to the top of the cell. This strip or wire is of sufficient length to extend through notches in the tops of the sides of the cells into the binding-post of the adjoining cell, as shown in detail in Fig. 3, thus connecting the two cells in a simple and convenient manner. The metal plate M should be amalgamated upon its upper surface with mercury. The zinc cylinders are placed about the cups with their lower ends standing on the metal plate. In this manner we obtain a very simple and efficient connection with all of the positive elements of the battery and dispense with the number of independent connections usually employed, to properly adjust which requires much time and labor. The zincs are preferably cast of sufficient thickness to outlast several charges of solution, and to replace them requires but a few moments of time. The zincs are held in their proper positions by a sheet of non-conducting material, such as wood boiled in paraffin, which is placed upon the upper surface of the metal plate and having holes cut therein of the proper size to receive the zincs.

While we prefer to project the porous or gelatinized cups through the bottom of the inner receptacle, we do not limit ourselves to that form of construction. They may be made to project through its sides or through both the sides and the bottom, the essential point being that the acid solution in the inner compartment shall be above the level of the openings of the cups, so that all the elements shall be wholly submerged.

In order to obtain the best results, it is necessary that the capacities of the inner and outer compartments shall be properly proportioned to each other. As our aim is to construct a battery which will be capable of long continuous service and require the minimum of attention while in use, it is necessary that the outer compartment, which holds the aqueous solution, shall be of sufficient capacity to contain enough water not only to hold in solution the zinc sulfate formed therein, but also to supply what will pass through the cups during one charge of the acid solution, and the inner compartment should be of sufficient capacity to receive the augmentation of water from the outer compartment without overflowing. In practice under usual conditions we have found that the capacity of the inner compartment should be about three-fourths of that of the outer compartment.

In the foregoing description we have set forth a construction in which the negative elements are placed within the cups and the positive elements about the cups, while the acid solution is contained in the inner compartment and the aqueous solution in the outer. While we prefer this form of construction, it is obvious that the positions of the elements and the solutions may be reversed—that is to say, the zincs may be placed within the cups with the aqueous solution in the inner compartment and the carbons about the cups in the outer compartment, in which is contained the acid solution. In this case D D in the drawings would represent the zinc elements, H H the carbon elements, and M a plate of carbon.

Having described our invention, what we claim as new, and desire to secure by Letters Patent, is—

1. In an electric battery, the combination with a containing vessel, of a receptacle supported therein and forming an inner compartment, the receptacle being composed of an impervious material, a diaphragm-cup, composed throughout of material which permits electrolytic action therethrough, sealed into the wall of said receptacle and projecting downward into the outer compartment, and electrodes or elements contained in said cup and the outer compartment, respectively, as set forth.

2. In an electric battery of the kind described, the combination with a containing vessel, of an inner impervious receptacle, a plurality of diaphragm-cups extending through apertures in the wall thereof, and a plurality of electrodes contained within the said cups, so as to be wholly submerged in the solution when the receptacle is filled to its normal level, as set forth.

3. In an electric battery of the kind described, the combination with a containing vessel of an inner impervious receptacle, a plurality of diaphragm-cups extending through apertures in the same, and a series of carbon electrodes suspended within the cups, a metal grid or head connecting the electrodes together, the electrodes and connector being wholly submerged in the solution when the receptacle is filled to its normal level, as set forth.

4. In an electric battery, the combination of a containing vessel, an inner impervious receptacle supported therein, diaphragm-cups sealed into the bottom of the receptacle and projecting into the outer compartment, carbon electrodes suspended in the cups, a metal head or grid connecting the carbon electrodes together, the electrodes and connector being wholly submerged in the solution when the inner receptacle is filled to its normal level, a conducting-plate at the bottom of the outer compartment and zinc electrodes standing thereon, the said electrodes and plate being wholly submerged in the solution when the battery is in use, and insulated conductors extending from the two sets of electrodes to the top of the battery, as set forth.

EDMUND TWEEDY.
ISAIAH L. ROBERTS.
GEORGE R. TWEEDY.

Witnesses as to Edmund Tweedy:
M. LAWSON DYER,
HILLARY C. MESSIMER.
Witnesses as to I. L. Roberts:
AUGUSTUS THIBAUDEAU,
AGNES M. SULLIVAN.
Witnesses as to George R. Tweedy:
F. D. TWEEDY,
A. C. PENNY.